United States Patent [19]
Jeronimidis et al.

[11] Patent Number: 5,083,417
[45] Date of Patent: Jan. 28, 1992

[54] APPARATUS FOR HARVESTING VEGETABLE MATTER

[75] Inventors: George Jeronimidis; Julian F. V. Vincent, both of Reading, England

[73] Assignee: Natural Technology Limited, Berkshire, England

[21] Appl. No.: 601,247

[22] Filed: Oct. 19, 1990

[30] Foreign Application Priority Data

Oct. 26, 1989 [GB] United Kingdom ............... 8924148

[51] Int. Cl.$^5$ ............................................. A01D 44/00
[52] U.S. Cl. ........................................ 56/9; 198/512
[58] Field of Search ................. 198/512; 56/8, 9, 16.4

[56] References Cited

U.S. PATENT DOCUMENTS

| | | | |
|---|---|---|---|
| 1,880,324 | 10/1932 | Malcom et al. | 198/512 X |
| 2,224,282 | 12/1940 | Weinschenk | 198/512 X |
| 3,286,447 | 11/1966 | Grinwald | 56/9 |
| 3,497,013 | 2/1970 | Baker . | |
| 3,498,033 | 3/1970 | Huff . | |
| 3,580,375 | 5/1971 | Nunes, Jr. | 198/512 |
| 3,878,669 | 4/1975 | Chaplin | 56/9 |
| 4,416,106 | 11/1983 | Hawk | 56/9 X |

FOREIGN PATENT DOCUMENTS 1531687  3/1977  United Kingdom .

Primary Examiner—William P. Neuder
Attorney, Agent, or Firm—Dilworth & Barrese

[57] ABSTRACT

Apparatus for harvesting vegetable matter from a body of water which has a facing pair of contra-advancing gripper belts. There may be water-shedding formations on the belts and a baler at the discharge end of the belt pair. The belts can be mounted in the bow of a boat. Various movements of the belts, one relative to the other, for improved harvesting efficiency, are provided.

11 Claims, 1 Drawing Sheet

APPARATUS FOR HARVESTING VEGETABLE MATTER

BACKGROUND OF THE INVENTION

This invention relates to apparatus for harvesting vegetable matter. More particularly, but not exclusively, it concerns apparatus for harvesting vegetable matter from a body of water.

There are a number of difficulties with the conventional methods of removing, rooting or floating weeds from still and running water. Most current methods rely on blades to cut the weeds. This has a number of disadvantages, one of the most important being that there is a tendency for the cut weeds to regenerate. Another is that it is not always easy to remove the cut fragments from the water. Floating mats of algae present special problems in that they tend to clog the cutting apparatus. They are coped with at present by the use of long rakes which is expensive in labour and not very efficient.

The conventional clearance techniques give rise to the additional problem of how to dispose of the cleared weed material. Usually, it is left to rot on the bank of the water body and this tends to kill the underlying vegetation with consequent weakening of the bank so that the bank often then collapses. The problem is likely to be compounded when a bank-mounted cutter such as a modified back hoe is used.

An alternative to the conventional mechanical clearance methods is chemical treatment. Costs tend to be higher and there is the probability of environmental problems, especially when herbicides are used which are not specific to the weeds to be cleared. In situ break down of the treated plant material tends to release large amounts of nutrients into the water and to consume most of the oxygen available therein. Thus, there is a threat to fish stocks and a tendency for floating mats of algae to develop which reduce penetration of light into the water, effectively inhibiting further plant growth.

In British Patent Application No. 8924148.3, the priority of which is declared in the present patent application, the official search report cited three documents in category 'A', that is, a document relevant as technological background or indicative of the state of the art. Set out below is a brief statement of what it is believed these three documents disclose:

U.S. Pat. No. 3,498,033 discloses a method and apparatus for harvesting sea plants and includes a harvesting vessel with cutting apparatus on an inclined endless belt.

U.S. Pat. No. 3,497,013 discloses apparatus, for use on dry land, to harvest cabbage and lettuce and includes two "co-acting spring biased endless belt means" which grip the vegetables in between.

G.B. Patent Spec. No. 1,531,687 discloses a method apparatus for separating adsorbable hydrocarbons floating on a liquid and includes an absorbant (sic) plastics fibre material, circulating along an endless path.

SUMMARY OF THE INVENTION

It is an object of the present invention to overcome or at least reduce some of the disadvantages of the conventional weed clearance methods.

According to the present invention there is provided apparatus for harvesting vegetable matter from a body of water, the apparatus comprising:

i) spaced first and second endless gripper belts which face each other to define in the space in between a lifting channel which extends from an inlet end to a discharge end;

ii) a first inlet end roller over which the first belt advances and a second inlet end roller over which the second belt advances;

iii) drive means for advancing the first and second belts around the inlet end rollers in respective directions such that both the inside belt lengths, that is, those which define the two faces of the lifting channel, advance from the inlet end to the discharge end; and iv) structure for maintaining the relative positions of the inlet end rollers, and for adjusting the distance separating the first and second inlet end rollers, thereby to adjusting the width of the nip which defines the inlet end of the lifting channel.

It will be understood that the invention has application to harvesting activities quite separate from weed clearance. Furthermore, the apparatus would harvest vegetable matter on land as well as from a body of water, and could be used for harvesting matter which is not vegetable matter, for example, empty bottles, drinks cartons and wrapping papers discarded in public places such as on a sand beach.

It will be understood that the opposed endless belts characteristic of the apparatus of the invention tend to draw vegetable matter into the nip between the inlet end rollers in much the same way as a cow will grip grass within a curl of her tongue, and the belts will draw the vegetable matter up the lifting channel, thus breaking the vegetation in tension rather than by cutting. This has the added advantage that a roughly broken plant stem is less likely to regenerate. Some vegetation will also be uprooted by the tension. Thus the machine will not only harvest weed but also thin the population of plants by removing whole plants, roots included.

It will also be appreciated that the transverse pressure on the vegetable matter as it ascends the lifting channel will tend to squeeze water from the plant so that the plant material discharged from the discharge end of the lifting channel is relatively free of water. In this way, the apparatus of the invention has advantages over conventional methods such as the use of long rakes in which large quantities of water are taken inboard of the harvesting vessel along with the harvested vegetable matter. It will normally be necessary to make provision for the pressure to be adjusted, so that water is expressed from the plant material without breaking open the plant cells, thus preventing release of nutrients.

Disposal of the harvested matter beyond the discharge end of the gripper belts is relatively simple, for the relatively dry mat of vegetable matter can be fed to a baler, and the baled vegetable matter can be handled thereafter in a variety of different ways, in much the same manner as bales of hay or straw.

For a better understanding of the present invention, and to show more clearly how the same may be carried into effect, reference will now be made, by way of example, to the accompanying drawings.

DETAILED DESCRIPTION

Figure 1:
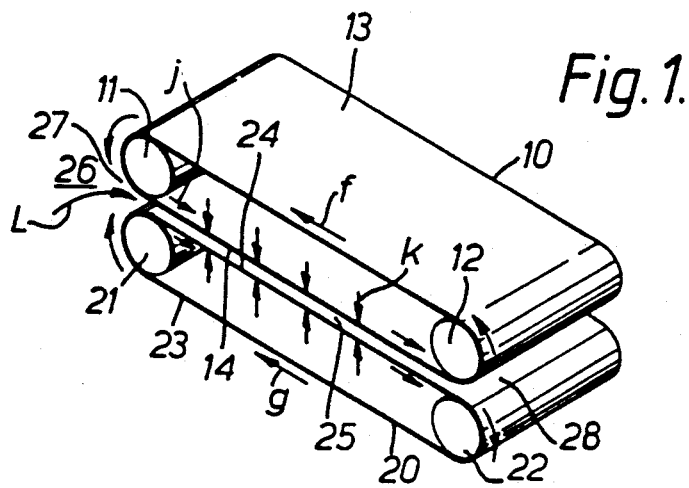
FIG. 1 is a perspective view of a gripper belt pair as used in the apparatus of the present invention.

Referring to FIG. 1, a first belt 10 advances (in the direction of arrow f) around a first inlet end roller 11 and a first discharge end roller 12, so that there is an endless loop of the belt 10 with an outwardly directed face 13 and an inwardly directed face 14.

In the same way, a second endless belt 20 advances (in the direction of arrow g) around a second inlet end roller 21 and a second discharge end roller 22, the belt having an outwardly directed face 23 and an inwardly directed face 24.

In accordance with conventional conveyor belt technology for keeping the belt central on the rollers, the rollers are crowned, that is, with slightly larger diameter mid-way along their length than at the ends of the rollers.

Between the inward faces 14 and 24 is a lifting channel 25. Material at the inlet end 26 of the apparatus is drawn (as shown by arrow L) into the nip 27 and carried up the lifting channel 25 by the advancing movement (arrow j) of the belts 10 and 20, to be discharged ultimately at the discharge end 28 of the lifting channel 25.

Means (not shown) apply compressive stress to the walls 14 and 24 of the lifting channel 25 by pressure (arrows k) on the belts 10 and 20 from inside their respective endless loops.

Figure 2:
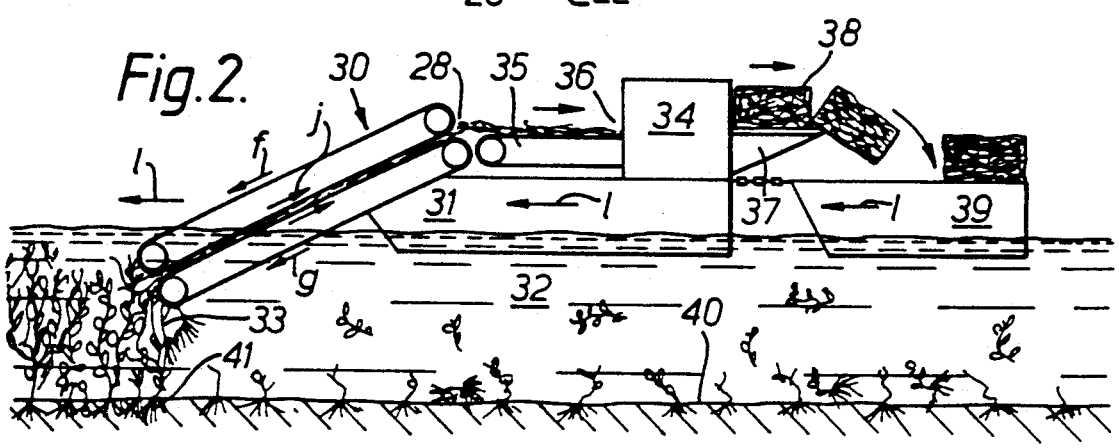
FIG. 2 is a vertical longitudinal section through a body of water and a first embodiment of the apparatus of the invention, showing the apparatus in use.
Figure 3:
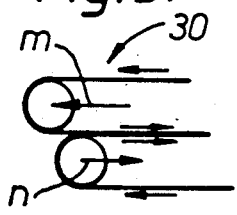
FIG. 3 is a detail of FIG. 2, showing the inlet end of the gripper belt pair.
Figure 4:
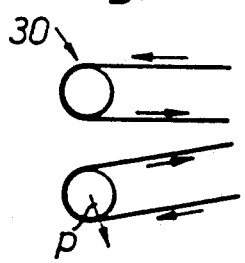
FIG. 4 is a detailed section, corresponding to FIG. 3, showing the gripper belts in a different disposition.
Figure 5:
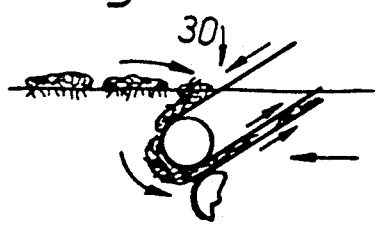
FIG. 5 is another drawing of the same detail as FIGS. 3 and 4, showing how floating vegetable matter is gathered into the nip.

Turning now to FIG. 2 of the drawings, the endless belt apparatus of FIG. 1 (here referenced 30) is mounted in the bows of a small boat 31 which floats on a body 32 of water infested with bottom rooting weed systems 33. In the stern of the boat 31 is a baling machine 34 and a conveyor 35 is provided, in order to carry vegetable matter from the discharge end 28 of the harvesting apparatus 30 to the inlet end 36 of the baler 34. A discharge conveyor 37 at the rear of the baler 34 serves to deliver bales 38, the output of the baler 34, into a tender 39 towed behind the boat 31.

In use, the boat 31 moves slowly forward (arrows 1) relative to the bottom 40 of the water body, to bring successive weed plants 33 into abutment with the inlet end 26 of the harvesting apparatus 30. The advancing movement f, g, j of the belts 10 and 20 grips the weeds 33 and pulls them from their roots 41 and up the lifting channel 25, along the conveyor 35, through the baler 34 and, as bales 38, into the tender 39.

Referring now to FIGS. 3 to 6, the inlet end of the belt apparatus 30 is provided with means to alter the relative positions of the inlet end rollers 11 and 21. Relative movement in the plane of the lifting channel 25, such as is shown by arrows m or n in FIG. 3, will often be useful to cope with different plant growth morphologies. Movement transverse to the plane of the lifting channel 25, such as is shown by arrow p in FIG. 4, will be of help in coping with large ranges of plant growth quantity.

The belts 10 and 20 preferably have a surface pattern or roughness which serves not only to grip the plant material with increased friction but also to assist the flow of surplus water out of the lifting channel 25. Indeed, for this purpose, the belts 10 and 20 may well be extensively perforated. With appropriate belt surface topography, floating weed will be gathered into a sub surface nip 27 in the manner shown in FIG. 5, although the FIG. 6 disposition, with the nip 27 actually on the surface of the water body, may be more appropriate where the only weed problem is with floating weeds.

Figure 6:
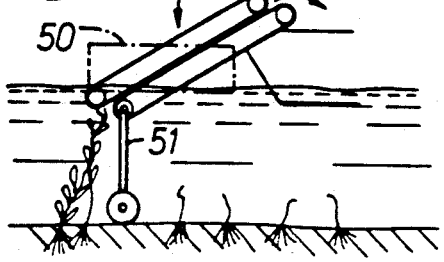
FIG. 6 is the same detail as FIG. 5, showing the belt pair in a slightly different position relative to the water surface.
Figure 7:
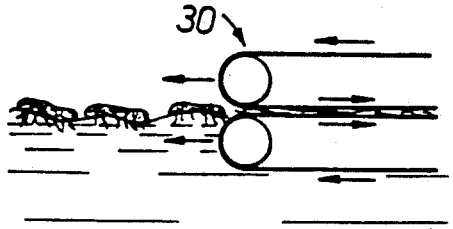
FIG. 7 is also a detail of the FIG. 2 apparatus, showing two different ways of supporting the inlet end of the belt pair.

In the case of a large capacity harvesting apparatus 30, teamed with a relatively small displacement boat 31, it may be preferred not to rely entirely on a cantilever arrangement for deployment of the apparatus 30. In such a case, the inlet end of the belt system 30 could be supported, as is shown in FIG. 6, by one or both of a float 50 or a stream bed-contacting undercarriage 51.

After passage of the harvesting apparatus there is a likelihood that some residual plant material will be left in the water, but this residual material is likely to be damaged, as by tearing, and to some extent crushed, and so it will be less likely to grow vigorously immediately after harvesting. This is an advantage of the apparatus where weed clearance is concerned.

With heavy weed infestation, there is likely to be a forward pull on the boat 31, as the weeds are gripped and drawn into the lifting channel 25. This pull on the boat can provide some of the motive power for movement of the boat through the water.

Means of disposal other than baling may well be appropriate in particular instances. Bales can be dumped on the shore or into the water body for later collection, rather than collected in a tender.

Apparatus in accordance with the invention can be provided in a range of different sizes, appropriate to the scale of the harvesting operation in view. Some harvesting operations may be assisted by the provision of a cutter which works at a lower level than the inlet end of the belt system, to avoid wholesale uprooting of plants from the bed of the water body.

Apart from any such supplementary cutter, the basic apparatus according to the invention does not rely on blade, systems and therefore is not incapacitated by contacting hard or sharp objects (such as discarded supermarket trolleys) likely to seriously damage blade systems.

Compressive pressure on the belt loops on either side of the inlet channel 25 can conveniently be provided by sets of idler rollers inside each belt loop, arranged with their axes transverse to the direction of advance of the belt and pressed, as by springs, onto the inside surface of the inside length of the respective belt loop. Preferably, the two belts are resiliently biased towards each other, to minimize the height of the lifting channel, but with the ability to be pushed apart against the bias, in order to allow thick objects to be carried between the belt loops up the channel.

The drawings do not show any prime mover or drive train to the belts 10, 20. Conventional systems are proposed. Drive to the discharge end rollers 12, 22 is mechanically more convenient, but drive to the inlet end rollers 11, 21 would be desirable, for example, in a situation where weed infestation is heavy and the belts are prone to stretching.

The belts could both be driven from a common drive member. Alternatively each belt could be provided with its own separate drive motor. To minimize slippage between the belts and their drive rollers, the co-operating surfaces of the belts and rollers could be provided with mutually engaging teeth.

Guides can be fitted to the inlet end of the apparatus, to deliver material into the nip and keep it away from the axles at the ends of the rollers, in a manner analogous to the way crop dividers can be fitted to the beds of combine harvesters.

At least one of the gripper belts may includes water-shedding formations over substantially the entire surface area thereof. The water-shedding formations can be constituted by apertures through the surface of the belt or by a pattern of blind recesses in the surface of the belt on the outside of its loop, these recesses constituting water discharge ducts which terminate either at one of the longitudinal edges of the belt or at a through-aperture in the thickness of the belt. The outside surface of at least one of the belt loops may be provided with a multitude of projections to improve gripping vegetable matter at the inlet nip. These projections may be constituted by ridges extending across the width of the belt. A cutting device for separating vegetable matter being drawn into the inlet nip from other vegetable matter located lower down in the body of water, could also be provided.

What is claimed is:

1. Apparatus for harvesting vegetable matter from a body of water, the apparatus comprising:
   i) spaced first and second endless gripper belts, said first belt situated above said second belt in a vertical direction and said belts facing each other in the vertical direction to define in the vertical space extending between them a lifting channel which extends from an inlet end to a discharge end;
   ii) a first inlet end roller over which the first belt advances and a second inlet end roller over which the second belt advances;
   iii) drive means for advancing the first and second belts around the inlet end rollers in respective directions such that both inside belt lengths which define the two faces of the lifting channel, advance from the inlet end to the discharge end; and
   iv) structure for maintaining the relative positions of the inlet end rollers;
   wherein said first and second belts are arranged to draw vegetable matter into a nip defined by said inlet end rollers and up said lifting channel to break the vegetable matter in tension rather than by cutting.

2. Apparatus as claimed in claim 1 and including structure to maintain a set spacing of the gripper belts throughout the length of the lifting channel.

3. Apparatus as claimed in claim 2 wherein the spacing-maintaining structure comprises a plurality of parallel idler rollers inside each of the two belt loops, arranged transverse to the direction of advance of the belt and to press on the inside surface of the inside length of the belt loop.

4. Apparatus as claimed in claim 1 and including apparatus for compacting the harvested vegetable matter which is discharged from the lifting channel at its discharge end.

5. Apparatus as claimed in claim 4 wherein the compacting apparatus is baling machine.

6. Apparatus as claimed in claim 1 and mounted on the bow of a boat.

7. The apparatus of claim 1 wherein said first and second belts are arranged to draw the vegetable matter into said nip in a manner similar to a cow gripping grass with a curl of her tongue.

8. The apparatus of claim 1 wherein said first and second belts are arranged to apply transverse lifting pressure on the vegetable matter as this matter ascends said lifting channel.

9. Apparatus for harvesting matter, the apparatus comprising:
   i) spaced first and second endless gripper belts, said first belt situated above said second belt in a vertical direction and said belts facing each other to define in the vertical space extending therebetween, a lifting channel which extends from an inlet end to a discharge end;
   ii) a first inlet end roller over which the first belt advances and a second inlet end roller over which the second belt advances;
   iii) drive means for advancing the first and second belts around the inlet end rollers in respective directions such that both inside belt lengths which define the two faces of the lifting channel, advance from the inlet end to the discharge end; and
   iv) structure for maintaining the relative positions of the inlet end rollers;
   wherein said first and second belts are arranged to draw matter into a nip defined by said inlet end rollers and up said lifting channel to break the matter in tension rather than by cutting.

10. The apparatus of claim 9 wherein the belts are arranged to draw the matter into the nip in a manner similar to a cow gripping grass with a curl of her tongue.

11. The apparatus of claim 9 wherein said first and second belts are arranged to apply transverse lifting pressure on the matter as the matter ascends the lifting channel.

* * * * *